United States Patent
Yang et al.

(10) Patent No.: US 11,892,194 B2
(45) Date of Patent: Feb. 6, 2024

(54) AIR CLEANER

(71) Applicant: LG Electronics Inc., Seoul (KR)

(72) Inventors: Taeman Yang, Seoul (KR); Joonmin Park, Seoul (KR); Choonmyun Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 17/371,710

(22) Filed: Jul. 9, 2021

(65) Prior Publication Data

US 2022/0010991 A1  Jan. 13, 2022

(30) Foreign Application Priority Data

Jul. 10, 2020  (KR) ........................ 10-2020-0085480

(51) Int. Cl.
| | | |
|---|---|---|
| F24F 8/10 | (2021.01) | |
| F24F 3/16 | (2021.01) | |
| B01D 46/00 | (2022.01) | |
| F24F 1/028 | (2019.01) | |
| F24F 8/80 | (2021.01) | |
| B01D 46/60 | (2022.01) | |
| B01D 46/24 | (2006.01) | |
| F24F 7/013 | (2006.01) | |
| F24F 110/52 | (2018.01) | |
| F24F 3/00 | (2006.01) | |

(52) U.S. Cl.
CPC ............ *F24F 8/10* (2021.01); *B01D 46/0049* (2013.01); *B01D 46/2403* (2013.01); *B01D 46/60* (2022.01); *F24F 1/028* (2019.02); *F24F 3/16* (2013.01); *F24F 7/013* (2013.01); *F24F 8/80* (2021.01); *B01D 2273/30* (2013.01); *F24F 2003/008* (2013.01); *F24F 2110/52* (2018.01)

(58) Field of Classification Search
CPC ..... F24F 1/028; F24F 3/16; F24F 8/10; B01D 46/00; B01D 46/0049
See application file for complete search history.

(56) References Cited

FOREIGN PATENT DOCUMENTS

| CN | 106839139 A | * | 6/2017 | ............... A61L 9/22 |
|---|---|---|---|---|
| EP | 3273063 | | 1/2018 | |
| KR | 20200072033 | | 6/2020 | |
| WO | WO2019190112 | | 10/2019 | |
| WO | WO2020089581 | | 5/2020 | |

OTHER PUBLICATIONS

Extended European Search Report in European Appln. No. 21184787.6, dated Dec. 8, 2021, 6 pages.

* cited by examiner

*Primary Examiner* — Robert A Hopkins
(74) *Attorney, Agent, or Firm* — Fish & Richardson P.C.

(57) ABSTRACT

An air cleaner includes a blower, a circulator disposed over the blower, and a mover coupled to the circulator and configured to change an arrangement of the circulator. The circulator includes a lower cover, an upper cover disposed over the lower cover, a blower fan rotatably disposed between the lower cover and the upper cover, a motor disposed on an upper side of the lower cover and rotating the blower fan, an inner cover disposed over the lower cover and receiving a lower portion of the blower fan, and a bell mouth protruding upwardly from an inner circumferential end of an inner plate of the inner cover and spaced apart outwardly from a circumferential surface of a suction guider of the blower fan, so as to guide air, drawn in through an inlet of the lower cover, toward an inlet of the blower fan.

18 Claims, 13 Drawing Sheets

AIR CLEANER

CROSS-REFERENCE TO RELATED APPLICATION

This application claims priority to and the benefit of Korean Patent Application No. 10-2020-0085480, filed on Jul. 10, 2020, the disclosure of which is incorporated herein by reference in its entirety.

BACKGROUND OF THE INVENTION

1. Field of the Invention

The present disclosure relates to an air cleaner, and more particularly to an air cleaner having a circulator mounted on an upper side thereof and configured to control a flow direction of clean air.

2. Description of the Related Art

An air cleaner is a device for filtering air and discharging the filtered air to a room to reduce dust and bacteria in the air of the room. The air cleaner filters out foreign matter by generating a flow of air in a room, and discharges air from which the foreign matter is removed.

There is disclosed a structure in which an inlet is formed on a circumferential surface of a cylindrical case in order to draw in air over a large area of a corresponding space and to discharge filtered air, and the filtered air is discharged upwardly. However, in order to discharge the filtered air to a distant area in the corresponding space, a separate device is provided for changing an air flow direction to an upward direction in which the filtered air is discharged, thereby discharging the filtered air to a large area of a room.

Korean Laid-Open Patent Publication No. KR10-2018-0000121 discloses a blower for causing air to flow upwardly from a circumferential surface of a lower side thereof, and a flow switching device for switching a flow of air discharged upwardly.

The flow switching device has a structure which is coupled to the blower with a closed center portion, such that an axial flow fan having an annular inlet is used therein. The flow switching device having the axial flow fan may circulate air in a specific space by controlling the RPM to discharge a desired air volume. However, if an area of a discharged passage is reduced, an air volume may be reduced, and when the air passes through grills without separate vanes, energy loss of the flow may occur.

SUMMARY OF THE INVENTION

It is an object of the present disclosure to provide an air cleaner capable of discharging filtered clean air to a distant area in a radial direction.

Air may flow to a distant location by using a mixed flow fan having a circular inlet and mounted in a circulator. However, the circulator of the present disclosure is coupled to a mover so as to be changed in position, such that the inlet of the circulator may be partially closed. It is another object of the present disclosure to provide an air cleaner capable of minimizing a loss of air flow volume in a structure in which the inlet of the circulator is partially closed. That is, it is an object of the present disclosure to provide an air cleaner capable of maximizing a flow volume of air drawn in through the inlet of the blower fan.

It is yet another object of the present disclosure to provide an air cleaner capable of minimizing the formation of a vortex while the air, drawn into the circulator, flows to the inlet of a blower fan. In the circulator including the mixed flow fan, a problem of air backflow may occur between an inner plate for receiving the blower fan and a shroud of the blower fan. It is still another object of the present disclosure to provide an air cleaner capable of minimizing the backflow of air, blown by the blower fan, in a space between the inner plate and the shroud.

The objects of the present disclosure are not limited to the aforementioned objects and other objects not described herein will be clearly understood by those skilled in the art from the following description.

In accordance with an aspect of the present disclosure, the above and other objects can be accomplished by providing an air cleaner, including: a blower having an outlet formed on an upper side thereof; a circulator disposed over the blower and configured to control a wind direction of air flowing upwardly through the outlet; and a mover coupled to the circulator and configured to change an arrangement of the circulator, in which the mover may be coupled to a lower end of the circulator.

The circulator may include a lower cover, an upper cover, a blower fan, a motor, and an inner cover. The lower cover may be closed as a portion of the lower cover, in which the inlet is formed, is coupled to the mover. The blower fan disposed on an upper side of the lower cover may have a circular inlet formed on a lower side and including a suction guider formed around the inlet. The motor may be disposed on an upper side of the lower cover and at the inlet of the blower fan to rotate the blower fan. The inner cover may include: an inner plate having an inlet formed therein; and a bell mouth protruding upwardly from an inner circumferential end of the inner plate and spaced apart outwardly from a circumferential surface of the suction guider, so as to guide air, drawn in through the inlet of the lower cover, toward the inlet of the blower fan, thereby guiding the air drawn into the blower fan from a region greater than the inlet of the blower fan. In a structure in which the inlet of the blower fan is closed by a lower structure of the lower cover or the motor, the bell mouth is disposed outside of the inlet of the blower fan, thereby guiding the suctioned air without covering the inlet of the blower fan.

The blower fan may include a hub coupled to the motor, a shroud spaced apart from the hub and having an inlet which is formed at a center portion and through which air is drawn in, and a plurality of blades disposed between the hub and the shroud, wherein the suction guider may protrude downwardly from an inner circumferential end of the shroud, thereby guiding air flowing between the shroud and the hub.

The air cleaner may include the inner plate disposed under the shroud and having an inlet formed therein, wherein the bell mouth may protrude upwardly from an inner circumferential end of the inner plate, thereby guiding the air drawn into the blower fan and blocking air flowing backward between the shroud and the inner plate.

The bell mouth may include: an upper bell mouth protruding upwardly from the inner circumferential end of the inner plate; and a lower bell mouth protruding downwardly from the inner circumferential end of the inner plate, thereby securing an area for mounting the bell mouth, and thus guiding the air flowing through the inlet of the lower cover toward the blower fan.

An upper end of the bell mouth may be disposed above a lower end of the suction guider, thereby blocking air flowing backward between the shroud and the inner plate.

An upwardly extending length of the bell mouth may be greater than a separation distance between the bell mouth and the suction guider, thereby ensuring a function of the bell mouth guiding an air flow to the inlet of the blower fan.

The inner cover may further include a housing forming a space in which the motor is disposed, wherein the inner cover may have an annular inlet formed between the housing and the inner plate.

The inner cover may include a plurality of grills, which are arranged alternately in a vertical direction at the annular inlet formed between the housing and the inner plate, and which connect the housing and the inner plate, thereby stably connecting the inner plate and the housing even when vibrations are produced in the housing.

A distance between the housing and the bell mouth may be greater than a distance between the inner circumferential end of the shroud and an inner circumferential end of the outer hub, thereby securing a volume of air flowing into the housing of the blower fan.

The air cleaner may further include a protrusion protruding radially inwardly from a lower end of the bell mouth, thereby guiding the air, drawn in through the inlet of the lower cover, toward the inlet of the blower fan.

A length of the protrusion, which protrudes radially inwardly, may increase from a lower end to an upper end, thereby guiding the air, drawn in through the inlet of the lower cover, toward the inlet of the blower fan.

A diameter of an inner circumferential end of the protrusion may be greater than or equal to a diameter of the suction guider, such that the inlet formed in the blower fan may not be covered.

Ribs, protruding in opposite directions, may be disposed on at least one of the inner plate and the shroud, thereby blocking air flowing backward between the shroud and the inner plate.

The shroud may include a first rib formed at a position spaced apart radially outwardly from the suction guider, and protruding toward the inner plate; and the inner plate may include a second rib formed at a position spaced apart radially outwardly from the bell mouth and protruding toward the shroud, thereby blocking the air flowing backward between the shroud and the inner plate.

A lower end of the first rib may be disposed below an upper end of the second rib, thereby blocking the air flowing backward between the shroud and the inner plate.

The inner cover may include a housing disposed around the motor disposed on the upper side of the lower plate, wherein the housing may extend upwardly parallel to the bell mouth, thereby guiding the air drawn in through the inlet of the lower cover in an upward direction.

In accordance with another aspect of the present disclosure, the above and other objects can be accomplished by providing an air cleaner, including: a blower having an outlet formed on an upper side thereof; and a circulator disposed over the blower and configured to control a wind direction of air flowing upwardly through the outlet, wherein the circulator may include: a blower fan having a circular inlet formed on a lower side and an annular outlet formed on an upper side; an upper cover disposed over the blower fan, and guiding air, blown by the blower fan, in a direction in which a rotation axis of the blower fan is directed; a motor disposed at the outlet of the blower fan and rotating the blower fan; and an inner cover disposed around the motor, and guiding the air, drawn in through the inlet formed in the lower cover, toward the blower fan, wherein the inner cover may include a housing forming a space in which the motor is disposed, an inner plate spaced apart radially outwardly from the housing and forming an inlet with the housing, and a bell mouth protruding upwardly from an inner circumferential end of the inner plate, wherein the bell mouth may have a diameter greater than the inlet formed in the blower fan, such that even when the motor rotating the blower fan partially covers the inlet of the blower fan, the structure of the bell mouth may secure a volume of air flowing into the blower fan.

Other detailed matters of the exemplary embodiments are included in the detailed description and the drawings.

Effects of the Invention

The air cleaner according to the present disclosure has one or more of the following effects.

Firstly, in the air cleaner of the present disclosure, a mixed flow fan, having a circular inlet at a lower side and an annular outlet at an upper side, is used as the blower fan disposed in the circulator, such that filtered clean air may be discharged to a distant location in a radial direction, thereby providing comfort to users in a large area of a space.

Secondly, the circulator of the present disclosure has a structure in that even when a portion where the inlet is formed is partially closed, the bell mouth for guiding air to flow to the inlet of the blower fan is disposed outside of the inlet of the blower fan, thereby securing a flow rate of air flowing to the inlet of the blower fan, which produces the effect of increasing a volume of clean air.

Thirdly, in the structure of the bell mouth and the suction guider, it is possible to block air flowing backward between the shroud of the blower fan and the inner plate of the inner cover, thereby increasing a volume of air blown by the blower fan. Further, ribs are further provided for the shroud and the inner plate, thereby minimizing backflow of the air.

Fourthly, for the air drawn in through the lower cover, the bell mouth and the housing, which is disposed parallel to the bell mouth, may minimize the formation of a vortex in the air flowing into the blower fan, thereby securing a flow rate of air flowing into the blower fan.

The effects of the present disclosure are not limited to the aforesaid, and other effects not described herein will be clearly understood by those skilled in the art from the following description of the appended claims.

DETAILED DESCRIPTION OF THE PREFERRED EMBODIMENTS

Figure 1:
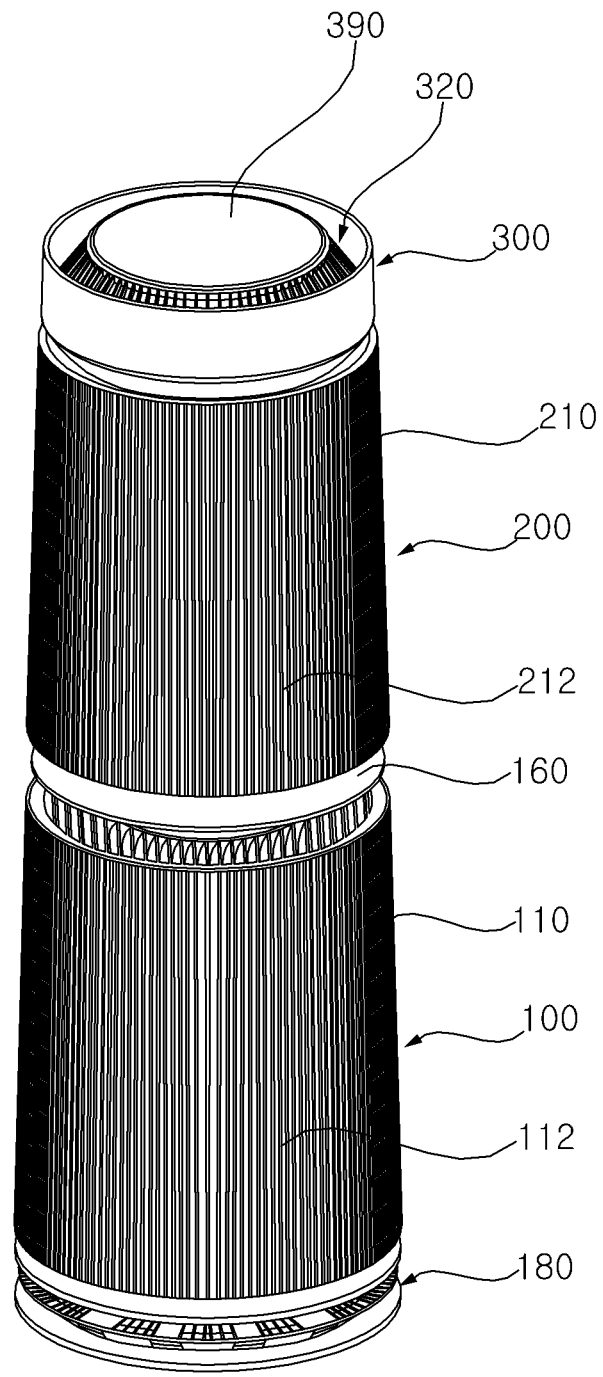
FIG. 1 is a perspective view of an air cleaner according to an embodiment of the present disclosure.

Advantages and features of the present disclosure and methods of accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

Hereinafter, embodiments of the present disclosure will be described with reference to the accompanying drawings for explaining an air cleaner.

Referring to FIG. 1, an air cleaner 10 according to an embodiment of the present disclosure includes blowers 100 and 200 generating an air flow, and a circulator 300 changing a discharge direction of the air flow generated by the blowers 100 and 200. The blowers 100 and 200. The blowers 100 and 200 include a first blower 100 generating a first air flow, and a second blower 200 generating a second air flow.

Figure 2:
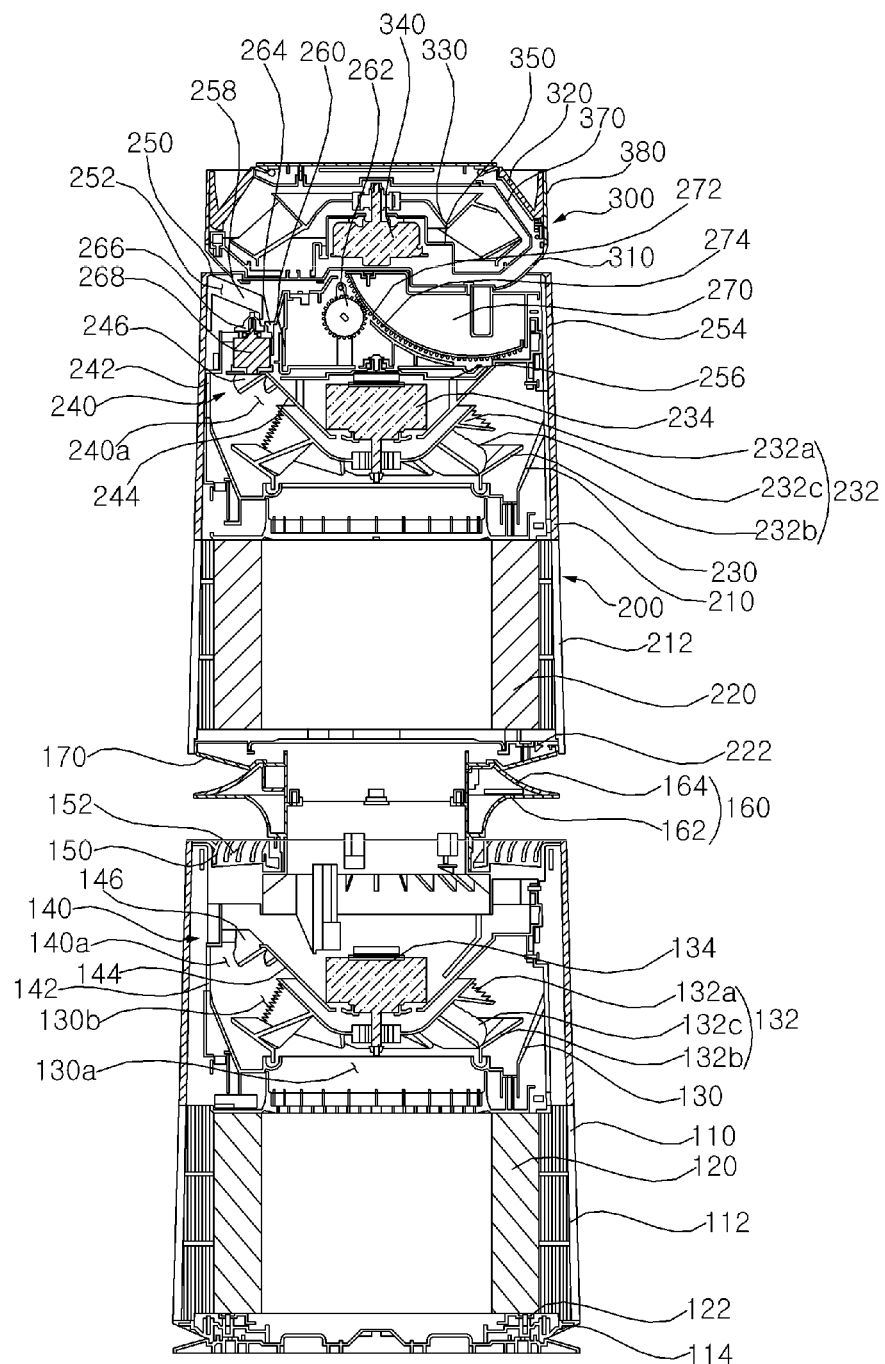
FIG. 2 is a side cross-sectional view of an air cleaner of FIG. 1.

Referring to FIGS. 1 and 2, the first blower 100 and the second blower 200 may be disposed vertically. The second blower 200 may be disposed over the first blower 100.

The air cleaner 10 includes cases 110 and 210 forming the exterior thereof. The cases 110 and 210 include a first case 110 forming the exterior of the first blower 100, and a second case 210 forming the exterior of the second blower 200.

The first case 110 may have a cylindrical shape. An upper portion of the first case 110 may have a diameter which is smaller than a diameter of a lower portion thereof.

The first case 110 may have a first inlet 112, through which air is suctioned. The first inlet 112 may allow the inside and outside of the first case 110 to communicate with each other. A plurality of first inlets 112 may be formed. The first case 110 may have the plurality of first inlets 112 formed on a circumference thereof and may have a first outlet 149 which is open upwardly.

The plurality of first inlets 112 may be elongated vertically. The plurality of first inlets 112 may be arranged evenly in a circumferential direction along an outer circumference of the first case 110, so that air may be suctioned in any direction relative to the first case 110.

As described above, the first case 110 has a cylindrical shape, and the plurality of first inlets 112 are formed along the outer circumference of the first case 110, such that an air suction amount may increase.

A first discharge cover 150, having a first outlet 152 which is open upwardly, may be disposed at an upper portion of the first blower 100. The first outlet 152 may have a ring shape.

A first filter 120 may be removably mounted in a mounting space. The first filter 120 has a cylindrical shape, and air may be introduced through an outer circumferential surface of the first filter 120. Impurities, such as fine dust contained in the air, may be filtered out while the air passes through the first filter 120.

As the first filter 120 has a cylindrical shape, air may be introduced in any direction relative to the first filter 120, thereby increasing an air filtering area.

The mounting space may be formed in a cylindrical shape corresponding to the shape of the first filter 120. While being mounted, the first filter 120 may be slidably inserted into the mounting space. By contrast, while being removed, the first filter 120 may be slidably withdrawn from the mounting space.

The first blower 100 includes: a first fan housing 130 disposed on an upper side of the first filter 120; a first fan 132 rotatably disposed inside the first fan housing 130; and a first fan motor 134 rotating the first fan 132.

The first fan housing 130 has a first housing suction hole 130a having a circular shape and formed at a lower portion thereof, and a first housing discharge hole 130b having a ring shape and formed at an upper portion thereof. The first fan 132 suctions air in an axial direction and discharges the air in a radially upward direction.

The first fan 132 includes: a first hub 132a, to which a rotating shaft of the first fan motor 132 as a centrifugal fan motor is coupled; a first shroud 132b spaced apart from the first hub 132a; and a plurality of first blades 132c disposed between the first hub 132a and the first shroud 132b. The first fan motor 134 may be coupled to an upper portion of the first fan 132.

The first blower 100 may further include a first blowing guider 140 coupled to the upper portion of the first fan 132, and guiding the air, having passed through the first fan 132, in an upward direction.

The first blowing guider 140 has an annular first air-blowing passage 140a, through which the air discharged from the first fan 132 flows.

The first blowing guider 140 may include: a first blower body 142 having a cylindrical shape and forming an exterior thereof; a bowl-shaped first inner cover 144 which is disposed at a center portion of the first blower body 142 and into which the first fan motor 134 is inserted; and a plurality of first guide vanes 146 which are spaced apart from each other in a circumferential direction on the first air-blowing passage 140a disposed between the first blower body 142 and the first inner cover 144.

The first blowing guider 140 has the annular first air-blowing passage 140a which is formed between the first blower body 142 and the first inner cover 144, and through which the air discharged from the first fan 132 flows.

The plurality of first guide vanes 146 may guide air, discharged from the first fan 132 to the first air-blowing passage 140a, in an upward direction. The respective first guide vanes 146 may be formed in a bent plate shape disposed in an upright position close to a vertical direction. The first guide vanes 146 may extend from an outer circumferential surface of the first inner cover 144 to an inner circumferential surface of the first blower body 142. The plurality of first guide vanes 146 may be spaced apart from each other. The plurality of first guide vanes 146 may guide air, introduced into the first air-blowing passage 140a of the first blowing guider 140 after passing through the first fan 132, in an upward direction.

The first fan motor 134 may be supported on an upper side the first inner cover 144. Further, a rotating shaft of the first fan motor 134 may extend downwardly from the first fan motor 134 and may pass through a bottom surface of the first inner cover 144 to be coupled to the first hub 132a.

The first blower 100 may further include a base 180 provided under the lower case 110 and placed on the ground. The base 180 may be spaced apart downwardly from a lower end of the first case 110. A base suction part 114 may be formed in the separation space between the first case 110 and the base 180.

The air cleaner 10 includes a partition plate 160 provided between the first blower 100 and the second blower 200. By providing the partition plate 160, the second blower 200 may be spaced apart upwardly from the first blower 100.

The partition plate 160 may separate or block an air flow, generated by the first blower 100, from an air flow generated by the second blower 200. By providing the partition plate 160, the first and second blowers 100 and 200 may be vertically spaced apart from each other.

A separation space, in which the partition plate 160 is disposed, is formed between the first blower 100 and the second blower 200.

The partition plate 160 includes a first partition plate 162, and a second partition plate 164 disposed over the first partition plate 162. The first partition plate 162 extends rounded in the upward direction, and the second partition plate 164 extends rounded in the downward direction. The first partition plate 162 extends upwardly from the first discharge cover 150. At least a portion of the first partition plate 162 is formed as a curved surface having a predetermined radius of curvature. A PCB device (not shown) may be disposed in the partition plate 160.

The first discharge cover 150 of the first blower 100 is disposed under the partition plate 160, and a support plate 170 of the second blower 200 is disposed over the partition plate 160.

The second blower may further include the support plate 170 supporting the second filter 220 of the second blower 200. The support plate 170 has an approximately annular shape. The support plate is disposed on the second partition plate 164.

The support plate 170, having an annular shape, extends from an inner circumference to an outer circumference and is slightly inclined upwardly relative to the axial direction.

The second case 210 may have a cylindrical shape. An upper portion of the second case 210 may have a diameter which is smaller than a diameter of a lower portion thereof. The second case 210 has a second inlet 212, through which air is suctioned. The second inlet 212 is elongated vertically, and a plurality of second inlets 212 may be formed which are spaced apart from each other in a circumferential direction.

The plurality of second inlets 212 may be arranged evenly in the circumferential direction along the outer circumference of the second case 210, so that air may be suctioned in any direction relative to the second case 210.

The second blower 200 also includes the second filter 220 disposed on the second filter frame 222, and the same description of the first filter 120 and the first filter frame 122 applies to the second filter 220 and the second filter frame 222.

The second blower 200 includes: a second fan 232 disposed on an upper side of the second filter 220 and generating an air flow; a second fan motor 234 rotating the second fan; and a second fan housing 230 in which the second fan 232 is disposed. The second fan 232, the second fan motor 234, and the second fan housing 230 may have the same configuration with a similar shape, and may perform the same function, as the first fan 132, the first fan motor 134, and the first fan housing 130 described above. Accordingly, the second fan 232 may be a mixed flow fan, and may include a hub 232a, a shroud 232b, and a plurality of blades 232c, as in the first fan 132.

The second blower 200 may further include a second blowing guider 240 disposed on an upper side of the second fan 232 and guiding air, having passed through the second fan 232, in an upward direction. The second blowing guider 240 may include: a second blower body 242 having a cylindrical shape and forming the exterior thereof, and a bowl-shaped second inner cover 244 which is disposed at a center portion of the second blower body 242 and into which the second fan motor 234 is inserted, and a plurality of second guide vanes 246 which are spaced apart from each other in the circumferential direction on a second airblowing passage 240a formed between the second blower body 242 and the second inner cover 244. The second blower body 242, the second inner cover 244, and the plurality of second guide vanes 246 may have the same configuration with a similar shape, and may perform the same function, as the first blower body 142, the first inner cover 144, and the plurality of first guide vanes 146 described above.

A second discharge cover 250, having a second outlet 252 which is open upwardly, may be disposed at an upper portion of the second blower 200. The second outlet 252 may have a ring shape. A second discharge grill 258 which is formed radially from the second outlet 252 may be disposed in the second discharge cover 250.

Figure 3:
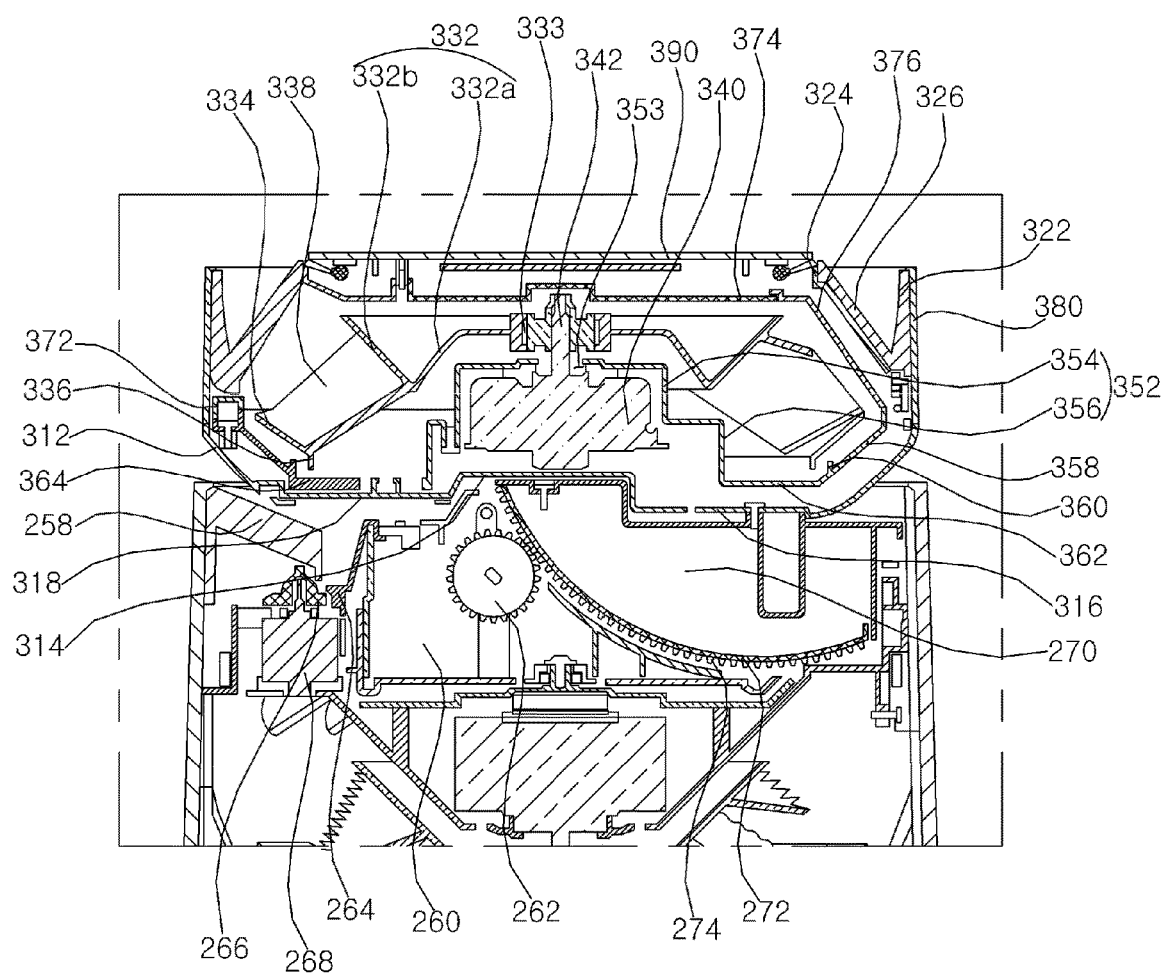
FIG. 3 is an enlarged view of a second blower and a circulator of FIG. 2.
Figure 4:
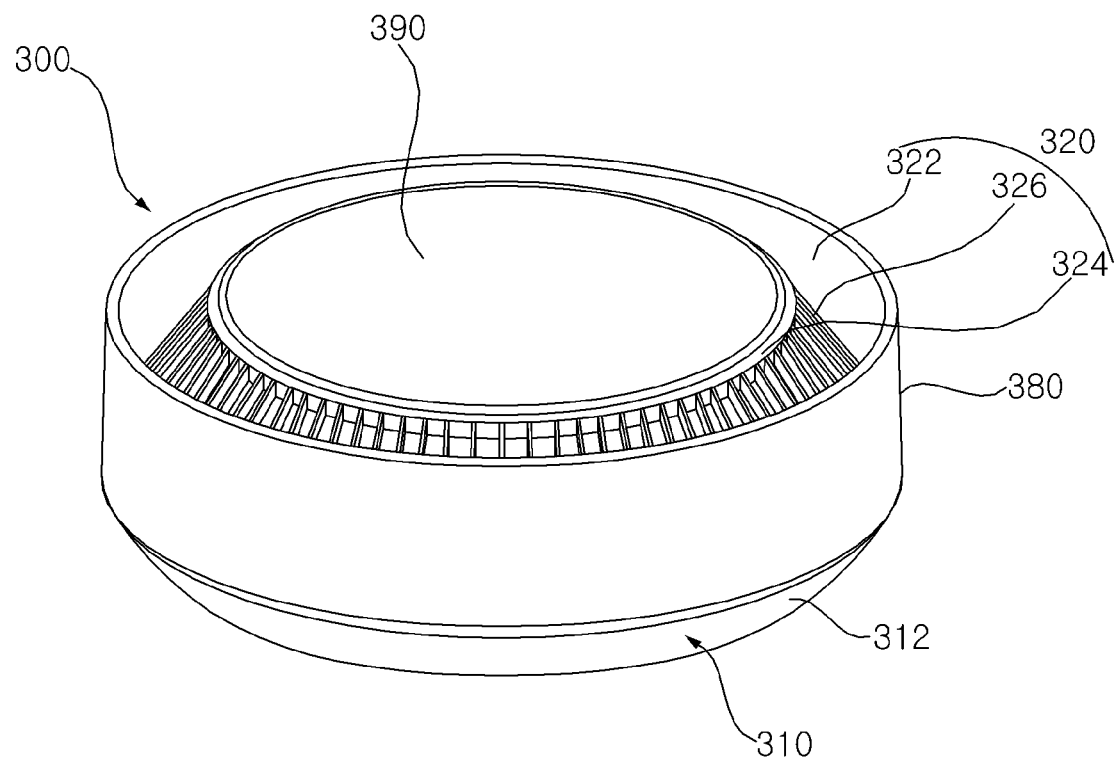
FIG. 4 is a perspective view of a circulator according to an embodiment of the present disclosure.
Figure 5:
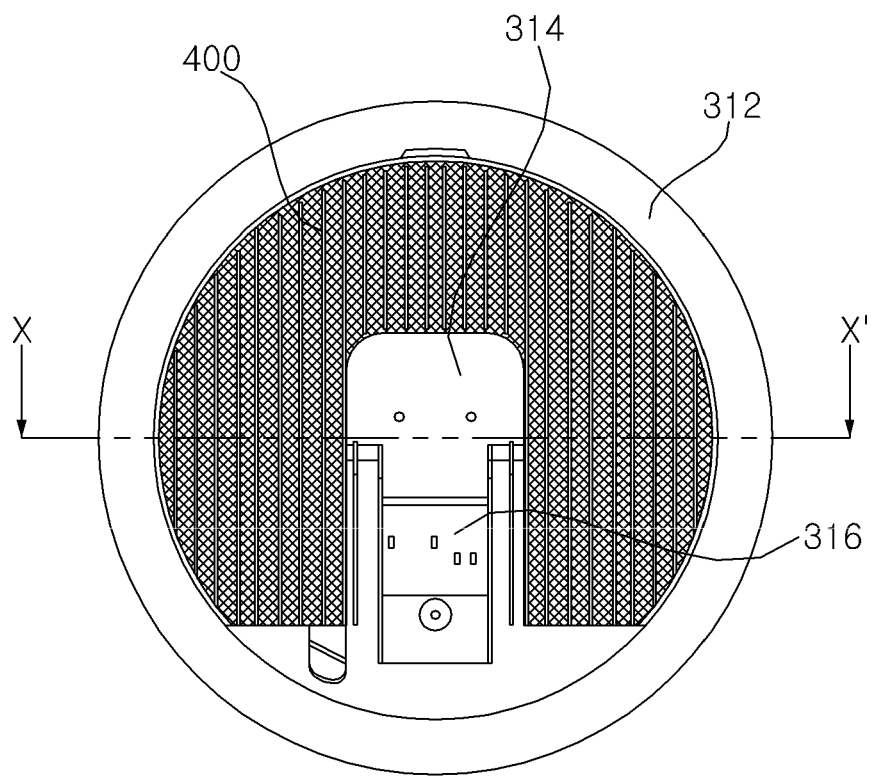
FIG. 5 is a bottom view of FIG. 4.

Referring to FIG. 3, the second discharge cover 250 may have an outer circumferential surface 254 disposed on an upper side of the second case 210 and forming a cylindrical edge, a guide base 256 disposed inside the outer circumferential surface 254, and a plurality of second discharge grills 258 extending radially from the guide base 256 to the outer circumferential surface 254.

The air cleaner 10 includes a moving guider 260 rotatably disposed on the guide base 256 and supporting the arrangement of the circulator 300, and a mover 270 moving along the moving guider 260 and changing an inclination angle of the circulator 300.

The moving guider 260, rotatably disposed on the guide base 256 and supporting the arrangement of the circulator 300, may be disposed on an upper side of the guide base 256. The moving guider 260 is rotatably disposed on the upper side of the guide base 256, and supports the arrangement of the circulator 300.

The guide base 256 may have a disc shape, and the second discharge grill 258 may be disposed around the guide base 256. The moving guider 260 may be rotatably disposed at the guide base 256. A space, in which a moving gear 262 and a gear motor (not shown) are disposed, may be formed in the moving guider 260.

The mover 270 is coupled to the circulator 300 and moves along the moving guider 260. The mover 270 may change an inclination angle of the circulator 300. The mover 270 includes a guide plate 272 which is convex toward the moving guider 260. A gear rail 274 engaged with the moving gear 262 may be formed on the guide plate 272.

The mover 270 is coupled to a lower surface of the circulator 300, thereby partially covering an inlet 310a formed on a lower part of the circulator 300. That is, the mover 270 partially covers the inlet 310a formed on the lower part of the circulator 300, thereby reducing the flow rate of air drawn into the circulator 300.

The moving guider 260 is rotatably disposed at the guide base 256. The moving guider 260 may be rotatably disposed at the center of the guide base 256. The moving guider 260 rotates about the center of the guide base 256, and may change a direction in which the circulator 300 is directed.

A rack gear 264 may be disposed on a circumference of one side of the moving guider 260.

A pinion gear 266, rotated while being engaged with the rack gear 264, and a motor 268 for driving the pinion gear 266 may be disposed on one side of the second discharge grill 258. The pinion gear 266 and the motor 268 may be disposed on a portion of an area in which the plurality of second discharge grills 258 are disposed.

The second filter 220 may have a cylindrical shape which is open at the top and the bottom. The second blower 200 further includes a second filter frame 222 forming a mounting space of the second filter 220.

The circulator 300 may be disposed on the upper side of the second blower 200. The circulator 300 may control a wind direction of air discharged upward from the second blower 200. The circulator 300 may be disposed parallel or inclined to a plane formed by the second outlet 252.

<Circulator>

The circulator according to an embodiment of the present disclosure will be described below with reference to FIGS. 3 to 9.

The circulator 300 may have an inlet 310a and an outlet 320a, and may cause filtered air, which is discharged from the second blower 200, to flow to a distant location.

The circulator 300 is disposed on the upper side of the second blower 200. An arrangement of the circulator 300 may be changed on the upper side of the second blower 200, and may cause the air, discharged upward by the second blower 200, to flow in a radial direction.

Figure 6:
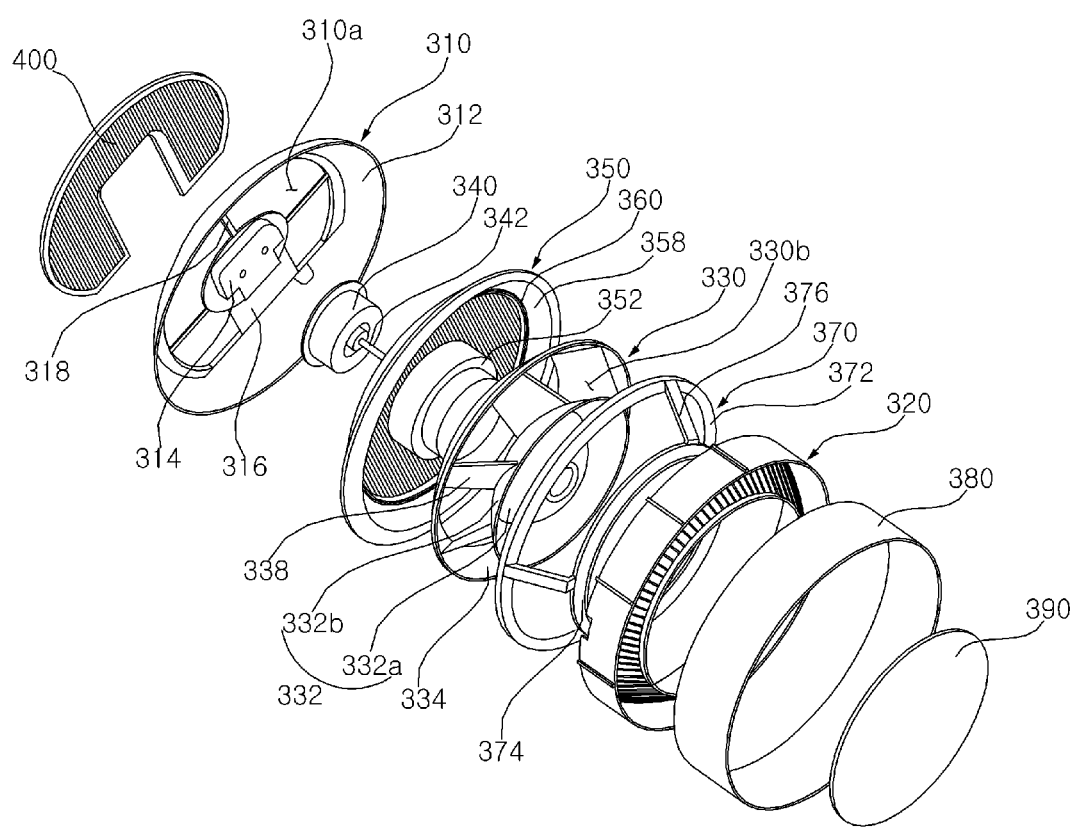
FIG. 6 is an exploded perspective view of FIG. 4.
Figure 7:
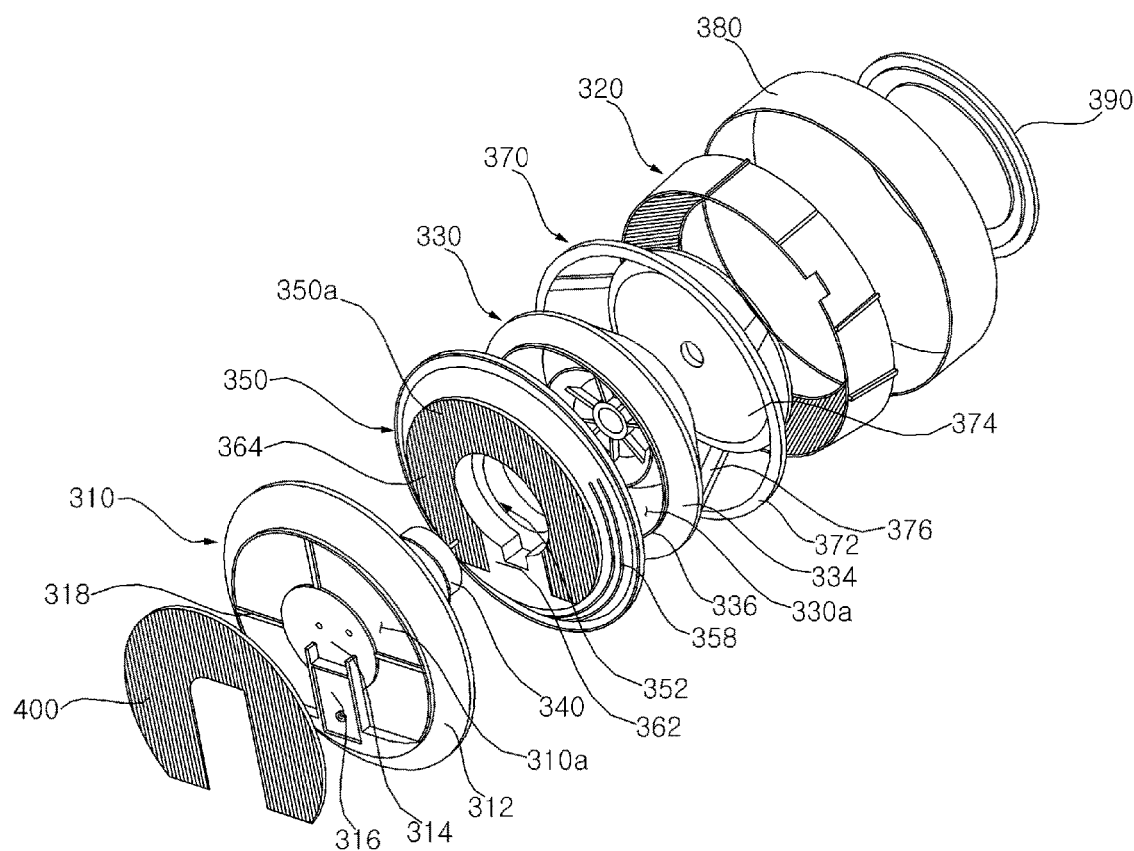
FIG. 7 is a rear perspective view of FIG. 6.

Referring to FIGS. 6 and 7, the circulator 300 may include: a lower cover 310 forming the inlet 310a; an upper cover 320 forming the outlet 320a; a blower fan 330 disposed between the lower cover 310 and the upper cover 320 and generating an air flow by rotation; a motor 340 disposed between the blower fan 330 and the lower cover 310, and rotating the blower fan 330; and an inner cover 350 disposed under the blower fan 330 and around the motor 340.

Referring to FIGS. 6 and 7, the circulator 300 may further include: a filter 400 filtering the air flowing through the inlet 310a formed in the lower cover 310; a supporter 370 disposed between the upper cover 320 and the blower fan 330, and supporting the upper cover 320; the outer cover 380 covering the outside of the discharge guider 322 of the upper cover 320; and a display 390 disposed over the supporter 370 and displaying an operation or status of the air cleaner 10.

As the blower fan 330, a mixed flow fan may be used which has a circular inlet 330a formed on a lower side thereof, and an annular outlet 330b formed on an upper side thereof. The blower fan 330 draws in air through the inlet 330a formed at the lower side thereof and discharges the air through the outlet 330b which is inclined radially upwardly. The inlet 330a of the blower fan 330 is disposed on an upper side of the lower cover 310.

Accordingly, the inlet 330a of the blower fan 330 may be partially covered by a lower plate 314 of the lower cover 310 which will be described later. A vortex is formed on an upper side of the lower plate 314 of the lower cover 310, which may be a factor in interrupting the flow of air drawn in through the inlet 330a of the blower fan 330.

Referring to FIG. 3, the blower fan 330 may include the hub 332 having a center to which the motor shaft 342 is coupled; the shroud 334 spaced apart from the hub 332 and having a center portion at which the inlet 330a for sucking air is formed; and the plurality of blades 338 disposed between the hub 332 and the shroud 334.

The plurality of blades 338 are provided between the hub 332 and the shroud 334. An upper end of the blades 338 is coupled to a lower surface of the hub 332, and a lower end thereof is coupled to an upper surface of the shroud 334. The plurality of blades 338 are spaced apart from each other on the circumference of the hub 332 in a circumferential direction.

The hub 332 includes an inner hub 332a which is upwardly convex to form a space in which the motor 340, disposed below the hub 332, is disposed; and an outer hub 332b extending radially from the inner hub 332a and inclined upwardly.

The inner hub 332a may have an upwardly convex bowl shape. A motor connector 333, to which the motor shaft 342, coupled to the motor 340 to be rotated thereby, is coupled, may be disposed at the center of the inner hub 332a. The motor connector 333 may have a hollow inner portion which is open at the top and the bottom, and through which the motor shaft 342 passes to be coupled thereto.

The outer hub 332b may form an inclined surface which extends upwardly to a radially outer side. The outer hub 332b may guide the air, drawn in through the inlet 330a, to flow radially upwardly. The upper end of the blades 338 is coupled to the lower surface of the outer hub 332b.

The circular inlet 330a, through which air is drawn in, is formed at the center of the shroud 334. The shroud 334 is disposed below the hub 332. The shroud 334 is spaced apart downwardly from the outer hub 332b. The shroud 334 extends upwardly in a radial direction. A diameter 330aD of the inlet 330a formed in the shroud 334 is smaller than a diameter 310aD of the inlet 310a formed in the lower cover 310 and a diameter 350aD of an inlet 350a formed in the inner cover 350. The plurality of blades 338 are coupled to the upper surface of the shroud 334.

Figure 8:
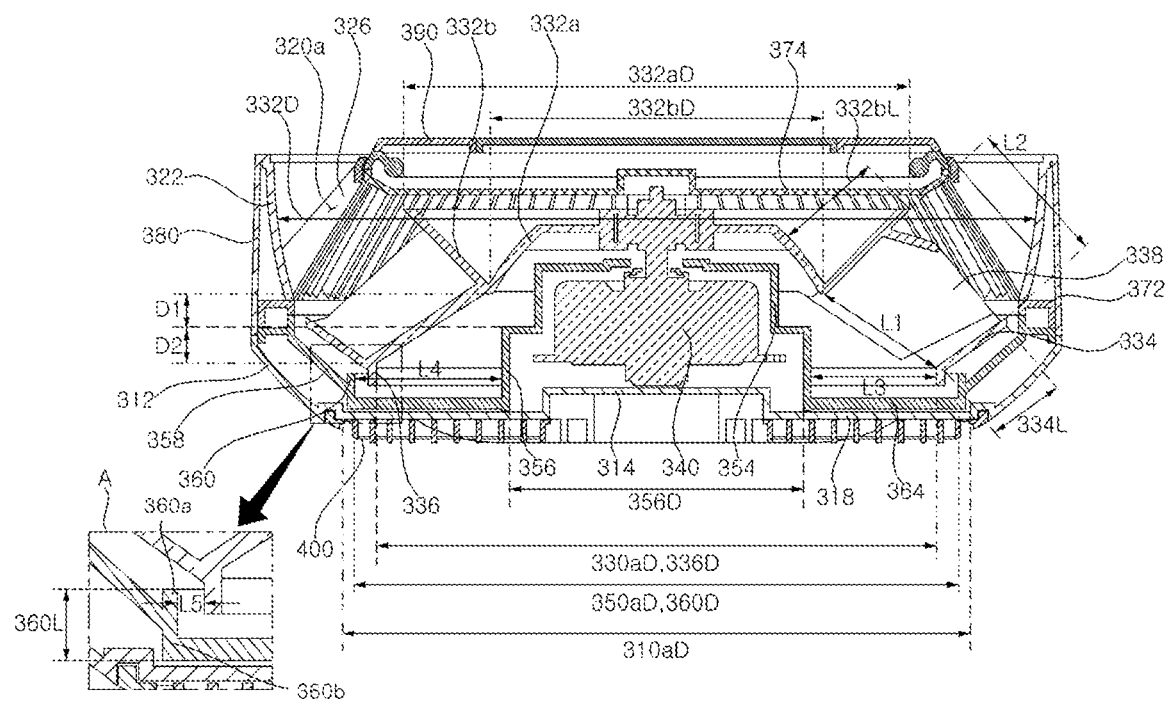
FIG. 8 is a cross-sectional view as taken along line X-X' of FIG. 5.

An outer circumferential end of the shroud 334 is inclined in a direction opposite to a direction of the inlet 330a. The outer circumferential end of the shroud 334 refers to a circumference of the upper end the shroud 334. The outer circumferential end of the shroud 334 is inclined upwardly so that air may be discharged in an upwardly inclined direction. Referring to FIG. 8, a direction in which the outer circumferential end of the shroud 334 is directed may be desirably parallel to a direction in which an outer circumferential end of the outer hub 332b is directed, or may be desirably inclined downwardly from the direction in which the outer circumferential end of the outer hub 332b is directed. Accordingly, a distance L1 between the inner circumferential end of the shroud 334 and the inner circumferential end of the outer hub 332b may be shorter than a distance L2 between the outer circumferential end of the shroud 334 and the outer circumferential end of the outer hub 332b.

A length 334L ("length of the shroud") extending from the inlet 330a of the shroud 334 to the outer circumferential end thereof is shorter than a length 332bL ("length of the outer hub") extending from the inner circumferential end of the outer hub 332b to the outer circumferential end thereof.

The outer circumferential end of the shroud 334 is disposed below the inner circumferential end of the outer hub 332b. The outer circumferential end of the outer hub 332b is disposed closer to a rotation axis of the blower fan 330 than the inner circumferential end of the shroud 334. The diameter 330aD of the inner circumferential end of the shroud 334 may be greater than a diameter 332D of the outer circumferential end of the outer hub 332b.

The blower fan 330 includes a suction guider 336 protruding downwardly from the inner circumferential end of the shroud 334. The suction guider 336 extends downwardly from a portion where the inlet 330a is formed, and an upper end and a lower end thereof may have the same diameter. The motor 340 and the housing 352, disposed around the motor 340, are disposed at the inlet 330a formed in the suction guider 336.

A distance L3 between the suction guider 336 and a lower housing 356 of the inner cover 350, which will be described below, may be approximately similar to the distance L1 between the inner circumferential end of the shroud 334 and the inner circumferential end of the outer hub 332b. The distance L3 between the lower housing 356 and the suction guider 336 may be 0.9 to 1.1 times the distance L1 between the inner circumferential end of the shroud 334 and the inner circumferential end of the outer hub 332b. The distance L3 between the lower housing 356 and the suction guider 336 is smaller than the distance L2 between the outer circumferential end of the shroud 334 and the outer circumferential end of the outer hub 332b. A distance L4 between the lower housing 356 and a bell mouth 360, which will be described below, is greater than the distance L1 between the inner circumferential end of the shroud 334 and the inner circumferential end of the outer hub 332b.

Referring to FIG. 3, the motor 340 is disposed under the blower fan 330. The motor 340 is disposed in a space formed under the inner hub 332a, and is coupled to the motor connector 333 of the inner hub 332a. The motor 340 has the motor shaft 342 extending upwardly and coupled to the hub 332. The motor 340 is disposed on an upper side of the lower cover 310. The motor 340 is disposed on an upper side of a lower plate 314 of the lower cover 310 which will be described below. Accordingly, the motor 340 does not interrupt the flow of air drawn in through the inlet 310a of the lower cover 310 and flowing to the blower fan 330.

The motor 340 is disposed on the upper side of the lower plate 314 of the lower cover 310 which will be described below. The motor 340 is disposed in a lower space of the inner hub 332a of the blower fan 330. The motor 340 may be disposed at the inlet 330a formed in the shroud 334. The motor 340 is disposed on the upper side of the lower plate 314, thereby preventing the formation of a vortex above the inlet 310a covered by the lower plate 314. The motor 340 may be fixedly disposed in the inner cover 350 which will be described below.

Referring to FIG. 7, the inner cover 350 is disposed under the blower fan 330 and forms a space in which the motor 340 is disposed. The inner cover 350 has the inlet 350a, through which air flows to the inlet 330a of the blower fan 330. A plurality of grills 364 are disposed at the inlet 350a formed in the inner cover 350. The plurality of grills 364 may be arranged alternately in a vertical direction.

Many vibrations are produced in the housing 352, since the motor 340 is mounted therein. The vibrations produced in the housing 352 may be transmitted to the inner plate 358. Accordingly, the plurality of grills 364, connecting the inner plate 358 and the housing 352, are arranged alternately in a vertical direction to increase rigidity.

Figure 9:
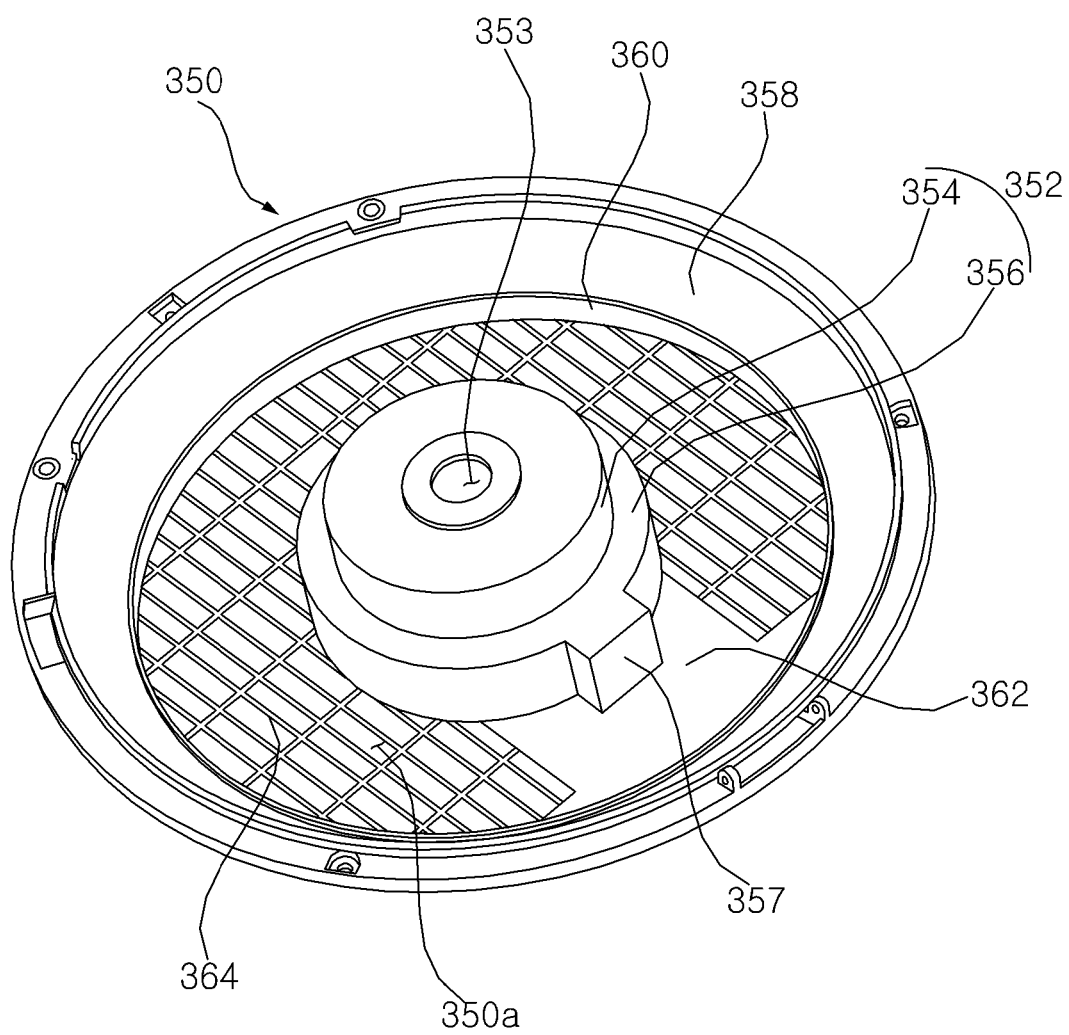
FIG. 9 is a perspective view of an inner cover according to an embodiment of the present disclosure.

Referring to FIG. 9, the inner cover 350 includes: the housing 352 forming a space in which the motor 340, disposed under the blower fan 330, is disposed; an inner plate 358 spaced apart radially outwardly from the housing 352, and disposed under the shroud 334; the grills 364 disposed at the inlet 350a formed between the inner plate 358 and the housing 352; and the bell mouth 360 protruding upwardly from the inner circumferential end of the inner plate 358.

The inner cover 350 may further include a first connection plate 362 disposed across the inlet 350a formed in the inner cover 350, to connect the housing 352 and the inner plate 358. The first connection plate 362 extends radially outwardly from the housing 352 to be connected to the inner plate 358. The inlet 350a formed in the inner cover 350 may have a ring shape which is partially closed by the first connection plate 362.

The housing 352 forms a space in which the motor 340 is disposed. The housing 352 is disposed on an upper side of the lower plate 314 of the lower cover 310, which will be described below, to guide the air flowing through the inlet 310a of the lower cover 310. The housing 352 may prevent the formation of a vortex above the lower plate 314. The housing 352 extends upwardly from the upper side of the lower plate 314, to guide the air flowing through the inlet 310a of the lower cover 310.

Referring to FIG. 8, the housing 352 extends upwardly parallel to the bell mouth 360. The housing 352 and the bell mouth 360 may guide the air, flowing through the inlet 310a of the lower cover 310, in an upward direction. The housing 352 and the bell mouth 360 may guide the air, flowing through the inlet 310a of the lower cover 310, toward the inlet 330a of the blower fan 330.

The housing 352 includes an upper housing 354 disposed under the inner hub 332a of the blower fan 330, and a lower housing 356 disposed under the upper housing 354.

The upper housing 354 is disposed in a lower space formed by the inner hub 332a. The upper housing 354 has a hollow inner portion and a cylindrical shape with an open bottom. A hole 353, through which the motor shaft 342 of the motor 340 passes, is formed on an upper surface of the upper housing 354.

The lower housing 356 has a greater diameter than the upper housing 354 and extends downwardly. In a region where the inlet 350a is formed, a diameter 356D of an outer circumferential end of the lower housing 356 is smaller than a diameter 332bD of the inner circumferential end of the outer hub 332b. The upper end of the lower housing 356 is disposed below the inner circumferential end of the outer hub 332b, and is disposed above the inner circumferential end of the shroud 334. The distance D1 that the upper end of the lower housing 356 and the inner circumferential end of the outer hub 332b are spaced apart from each other in an up-down direction is shorter than the distance D2 that the upper end of the lower housing 356 and the inner circumferential end of the shroud 334 are spaced apart from each other in the up-down direction. A circumferential surface of the lower housing 356 may guide the air, flowing upwardly through the inlet 350a of the inner cover 350, in a direction toward the outer hub 332b.

The lower housing 356 protrudes in a direction in which the inlet 350a of the inner cover 350 is not formed, such that a protrusion 357 may be formed in which a wire adapter (not shown) connected to the motor 340 is disposed. The motor 340 may be coupled to the lower housing 356 by a separate coupling member (not shown). The motor 340 is fixedly disposed in the housing 352. The motor 340 may be spaced apart upwardly from the lower housing 356.

The upper housing 354 may be disposed in a space formed under the inner hub 332a which is convex upwardly. A diameter of the upper housing 354 is shorter than a diameter of the inner circumferential end of the outer hub 332b.

Referring to FIG. 8, the inner plate 358 forms a space in which a lower portion of the blower fan 330 is received. The inlet 350a, through which air flows to the blower fan 330, is formed inside the inner plate 358. The inner plate 358 is disposed under the shroud 334 of the blower fan 330.

The bell mouth 360, protruding upwardly from a portion adjacent to the inlet 350a of the inner cover 350, is disposed on the inner plate 358. The bell mouth 360 protrudes upwardly from the inner circumferential end of the inner plate 358.

The bell mouth 360 has a ring shape and is spaced apart outwardly from the suction guider 336 of the shroud 334. The bell mouth 360 may guide the air, flowing through the inlet 350a of the inner cover 350, toward the inlet 330a of the blower fan 330.

The bell mouth 360 may be disposed approximately parallel to the suction guider 336 of the shroud 334. The upper end of the bell mouth 360 is disposed above the lower end of the suction guider 336. The bell mouth 360 is disposed radially outwardly of the suction guider 336. A diameter 360D of the bell mouth 360 is greater than a diameter 336D of the suction guider 336.

The bell mouth 360 includes an upper bell mouth 360a protruding upwardly from the inner circumferential end of the inner plate 358, and a lower bell mouth 360b protruding downwardly from the inner circumferential end of the inner plate 368.

Referring to FIGS. 6 and 7, the lower cover 310 is disposed below the motor 340 and the inner cover 350. The lower cover 310 covers the blower fan 330 and a lower side of the motor 340. The inlet 310a, through which outside air is drawn in, is formed below the inlet 350a formed in the inner cover 350.

Referring to FIG. 7, the lower cover 310 includes: an outer plate 312 disposed under the inner plate 358 of the inner cover 350; the lower plate 314 spaced apart radially inwardly from the outer plate 312, and covering a lower side of the motor 340; a second connection plate 316 disposed under the first connection plate 362 of the inner cover 350 and connecting the lower plate 314 and the outer plate 312; and a plurality of ribs 318 disposed at the inlet 310a formed between the lower plate 314 and the outer plate 312, and connecting the lower plate 314 and the outer plate 312.

Referring to FIG. 8, the outer plate 312 is disposed under the inner plate 358 of the inner cover 350. The outer plate 312 has a shape extending upwardly toward a radially outer side. At least a portion of the outer plate 312 may have a curved surface shape which is convex outwardly. In the curved surface shape, a portion of air discharged upwardly flows along a surface where the outer plate 312 is formed, such that an air flow may be formed in a direction in which the outlet 320a of the circulator 300 is directed.

Referring to FIG. 7, the lower plate 314 covers the lower surface of the housing 352. The lower plate 314 has an approximately circular shape and has a lower side coupled to the mover 270 that changes an arrangement of the circulator 300. The lower plate 314 covers the center of the inlet 310a formed in the lower cover 310. That is, by the lower plate 314, the inlet 330a of the blower fan 330 is partially closed.

The lower plate 314, disposed below the inlet 330a of the blower fan 330, may interrupt the flow of air drawn in through the inlet 330a of the blower fan 330. Further, as the inlet 330a of the blower fan 330 is partially covered, a problem may occur in that a vortex may be formed in the air above the lower plate 314. However, in the present disclosure, the motor 340 is disposed above the lower plate 314, thereby minimizing an area in which a vortex may be formed in the air inside the inlet 330a of the blower fan 330.

In addition, the housing 352 surrounding the motor 340 is disposed on an upper side of the lower plate 314, thereby guiding air flowing between the shroud 334 and the outer hub 332b of the blower fan 330.

The second connection plate 316 extends radially outwardly from one side of the lower plate 314, and is connected to the outer plate 312. The second connection plate 316 may be coupled to the lower plate 314 and the mover 270.

The second connection plate 316 may be disposed under the first connection plate 362. The second connection plate 316 is spaced apart downwardly from the first connection plate 362. A space for a wire connected to the motor 340 or the display 390 may be formed between the second connection plate 316 and the first connection plate 362.

Referring to FIG. 7, the filter 400 may be disposed at a portion where the inlet 310a of the lower cover 310 is formed. The filter 400 is mounted at the lower cover 310 to filter the air flowing through the inlet 310a of the lower cover 310.

Referring to FIGS. 6 and 7, the upper cover 320 includes: a discharge guider 322 having a cylindrical shape and forming the exterior thereof; a connect ring 324 spaced apart radially inwardly from the discharge guider 322 and having a ring shape; and a plurality of vanes 326 disposed at the annular outlet 320a formed between the discharge guider 322 and the connect ring 324 and guiding the air, blown by the blower fan 330, in an upward direction.

Referring to FIG. 8, the annular outlet 320a is formed inside the discharge guider 322. The discharge guider 322 has a cylindrical shape and extends upwardly so that the air discharged from the blower fan 330 may flow upwardly. The discharge guider 322 may have a shape with a thickness in the radial direction decreasing from a lower end toward an upper end. Accordingly, a diameter 332D of the inner circumferential end of the discharge guider 322 may increase from the bottom toward the top.

Referring to FIG. 8, the connect ring 324 may be disposed at a position where the upper end of the discharge guider 322 is formed. The connect ring 324 may come into contact with the supporter 370 which will be described below. The annular outlet 320a may be formed between the connect ring 324 and the discharge guider 322.

The respective plurality of vanes 326 are connected to the discharge guider 322 and the connect ring 324 and may be spaced apart from each other in a circumferential direction. An outer end of the respective plurality of vanes 326 is connected to the lower end of the discharge guider 322, and an inner end thereof is connected to the connect ring 324. Accordingly, the respective plurality of vanes 326 may have a shape extending upwardly toward the center of the blower fan 330. In order to cancel a rotational component of the air blown by the blower fan 330, a lower end of the plurality of vanes 326 may form a curved surface, and a straight surface may be formed toward the top.

The plurality of vanes 326 may have a shape with a thickness decreasing from an outer end toward an inner end.

Referring to FIGS. 6 and 7, the supporter 370 includes: an outer frame 372 having a ring shape and disposed on an upper end of the inner plate 358 of the inner cover 350; an upper plate 374 having a disc shape and disposed above the hub 332 of the blower fan 330; and a connection frame 376 connecting the outer frame 372 and the upper plate 374 and supporting the upper plate 374.

Referring to FIG. 8, the outer frame 372 has a ring shape and is disposed over the upper end of the inner plate 358. The outer frame 372 has a cross-section with a downwardly open U-shape. A space for the wire may be formed between the outer frame 372 and the inner plate 358.

The upper plate 374 has a disc shape and is disposed to cover an upper side of the hub 332. The upper plate 374 may support the display 390 disposed on the upper side thereof. The upper plate 374 has a smaller diameter than the outer frame 372 and may be disposed above the outer frame 372.

The connection frame 376 may connect the outer frame 372 and the upper plate 374 and may support the upper plate 374.

Referring to FIG. 6, the outer cover 380 is disposed on an outer circumference of the discharge guider 322 of the upper cover 320. The outer cover 380 has a cylindrical shape which is open at the top and the bottom.

Referring to FIG. 6, the display 390 is disposed over the upper plate 374. The display 390 has a touch panel to receive a user command. The display 390 may display an operating state of the air cleaner 10 or environment information of an indoor space for a user.

The following description will be given of differences during the operation of the circulator in structures of the present disclosure of FIG. 10A and the comparative example of FIG. 10B.

TABLE 1

| | Comparative example | Present disclosure |
|---|---|---|
| Rotation speed (RPM) | 870 | 870 |
| Air volume (CMM) | 4.5 | 4.8 |
| Power consumption (W) | 9.0 | 8.5 |
| Arrival distance (m) | 8 | 9 |

Figure 10A:
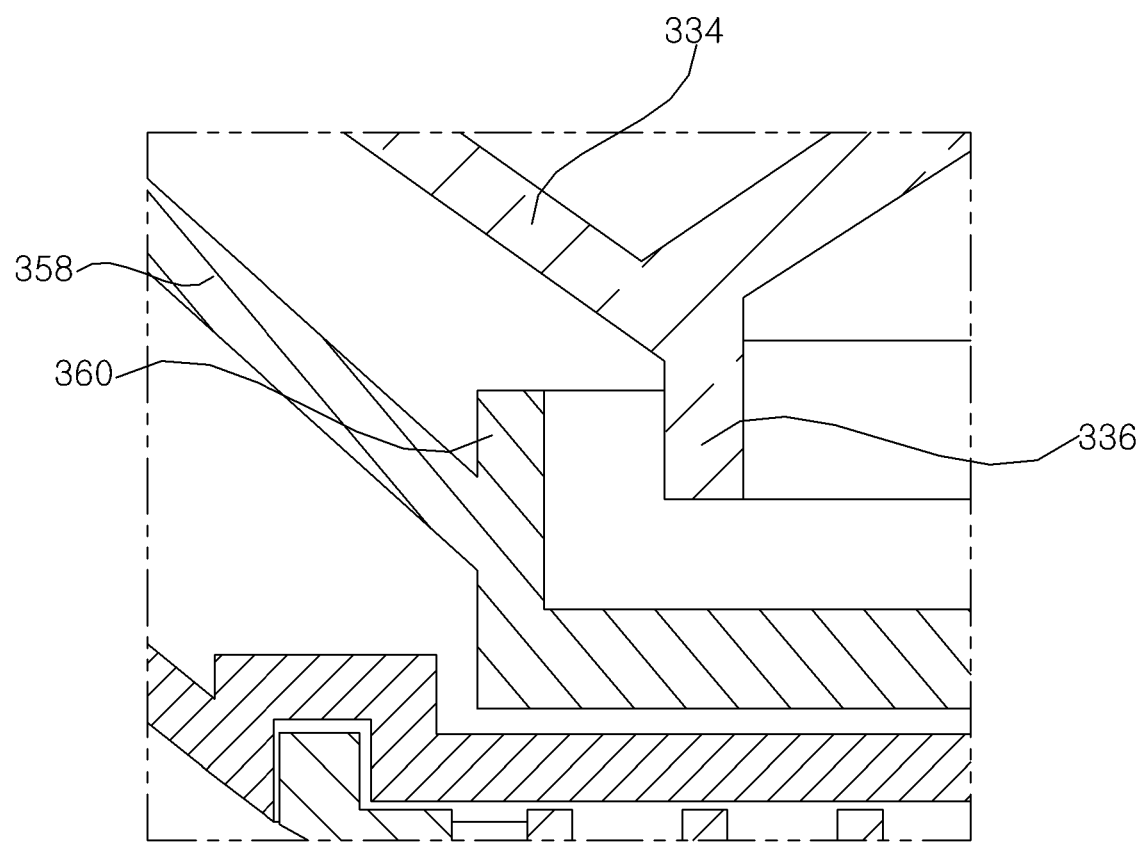
FIG. 10A is an enlarged view of portion A of FIG. 8.
Figure 10B:
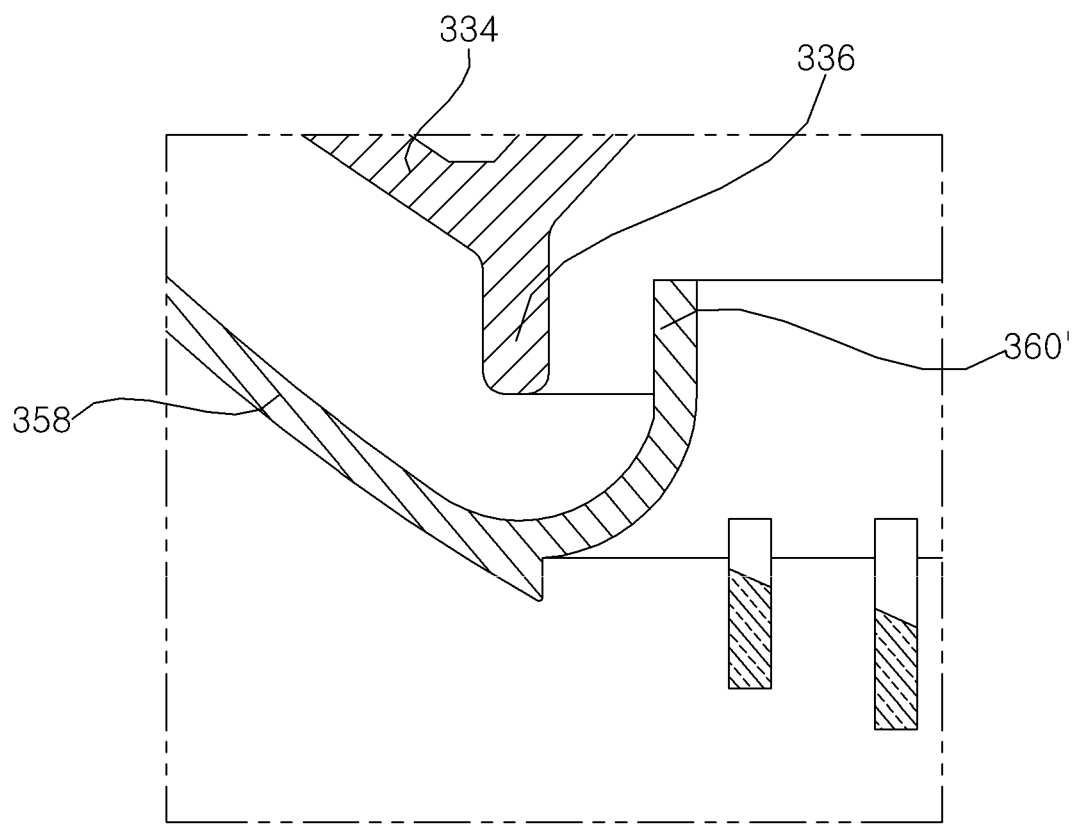
FIG. 10B is a cross-sectional view of another arrangement of a bell mouth as a comparative example of FIG. 10A.

The above Table 1 shows data obtained during the operation of the circulator with the bell mouth 360, disposed outside of the suction guider 336 according to the present disclosure as illustrated in FIG. 10A, and a bell mouth 336' disposed inside of the discharge guider 336 as illustrated in FIG. 10B.

In a structure where the inlet 330a of the blower fan 330 is partially covered by the lower plate 314 of the lower cover 310 as in the present disclosure, if the bell mouth 360 is disposed inside of the discharge guider 336, the bell mouth 360 may cause a reduction in the volume of air drawn into the blower fan 330.

As illustrated in FIG. 10A, it can be seen from Table 1 that when the bell moth 360 is disposed outside of the suction guider 336, an air volume increases even at the same rotation speed, compared to the structure of FIG. 10B. Further, as the volume of air passing through the blower fan 330 increases, a distance reached by the air blown by the blower fan 330 may also increase. The result can be seen from Table 1, in which an arrival distance increases when the circulator in FIG. 10A of the present disclosure is used, compared to an arrival distance when the circulator in the comparative example of FIG. 10B is used.

In addition, the bell mouth 360' disposed inside of the suction guider 336 may act as a resistance to the air drawn into the blower fan 330, thereby increasing the power consumption during the operation of the blower fan 330. It can be seen from Table 1 that when the bell mouth 360 of the present disclosure is disposed outside of the suction guider 336, the power consumption of the blower fan 330 is relatively low.

Figure 11A:
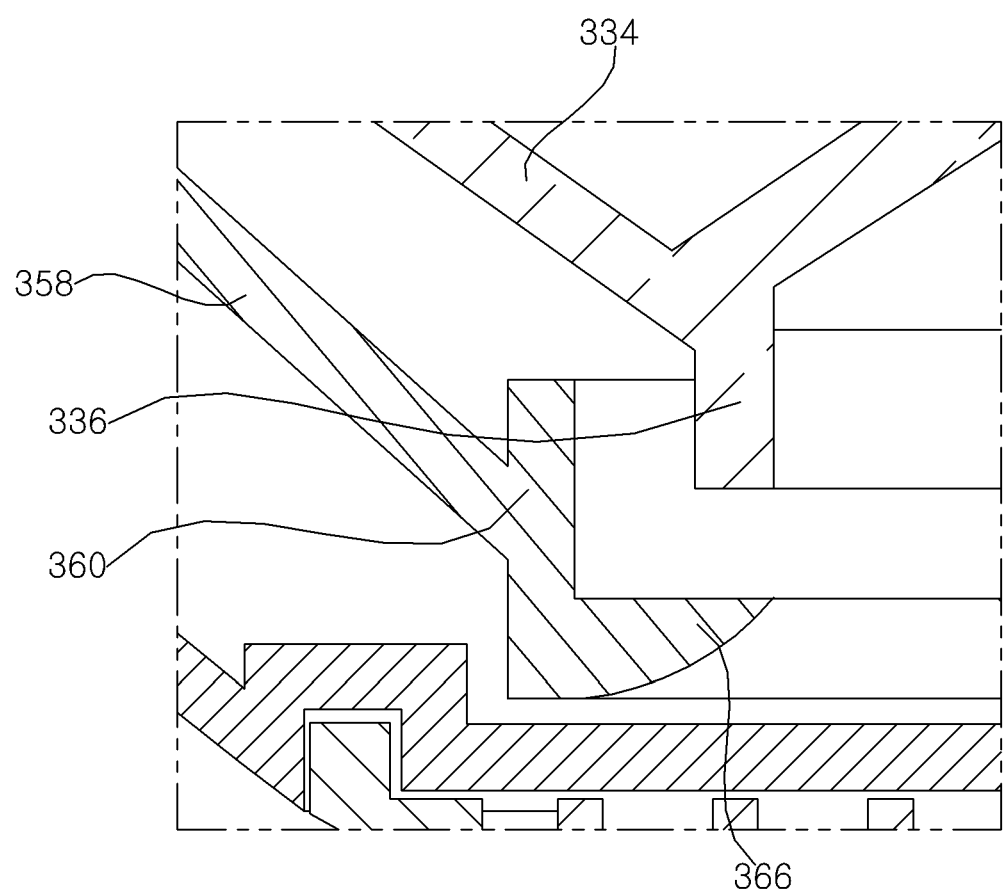
FIG. 11A is a diagram explaining a structure of a bell mouth according to another embodiment of the present disclosure.

Referring to FIG. 11A, a circulator according to a second embodiment of the present disclosure will be described below. The circulator 300 according to the second embodiment may include a protrusion 366 protruding radially inwardly from a lower end of the bell mouth 360. The protrusion 366 may guide the air, drawn in through the inlet 310a of the lower cover 310, toward the inlet 330a formed in the blower fan 330.

The protrusion 366 protrudes radially inwardly from the lower end of the bell mouth 360. The protrusion 366 protrudes radially inwardly from an inner circumferential surface of the bell mouth 360. A length of the protrusion 366, which protrudes radially inwardly, increases from the lower end to the upper end. The protrusion 366 may form a curved surface which is convex toward the center of the inlet 310a formed in the lower cover 310.

The protrusion 366 has a ring shape and may be disposed on the inner circumferential surface of the bell mouth 360. A diameter of the inner circumferential end of the protrusion 366 may be greater than or equal to a diameter of the suction guider 336. Here, the inner circumferential end of the protrusion 366 may refer to an upper inner end of protrusion 366.

Figure 11B:
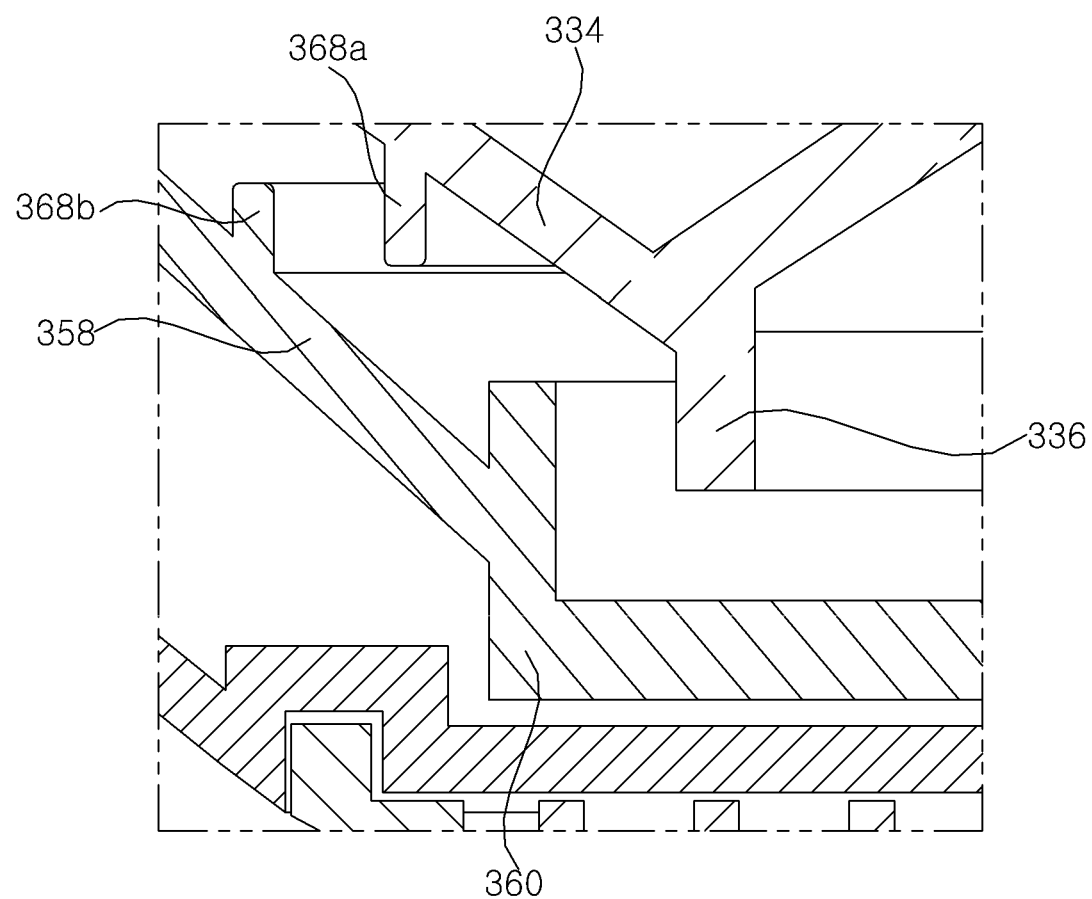
FIG. 11B is a diagram explaining a structure of a shroud and an inner plate according to yet another embodiment of the present disclosure.

Referring to FIG. 11B, a circulator according to a third embodiment will be described below. The circulator 300 according to the third embodiment includes ribs 368a and 368b formed on the shroud 334 and the inner plate 358, respectively, and protruding in opposite directions. The shroud 334 and the inner plate 358 may include the ribs 368a and 368b, respectively, which are formed on facing surfaces and protrude in opposite directions.

The shroud 334 may include the first rib 368a formed at a position spaced apart radially outwardly from the suction guider 336 and protruding toward the inner plate 358. The first rib 368a may protrude in a downward direction in which the inner plate 358 is disposed. The first rib 368a has a ring shape and may protrude downwardly from a lower surface of the shroud 334.

The inner plate 358 may include the second rib 268b at a position spaced apart radially outwardly from the bell mouth 360 and protruding toward the should 334. The second rib 368b may protrude in an upward direction in which the shroud 334 is disposed. The second rib 368b has a ring shape and may protrude upwardly from an upper surface of the inner plate 358.

A lower end of the first rib 368a is disposed below an upper end of the second rib 368b. Accordingly, the first rib 368a and the second rib 368b may block the flow of air flowing between the shroud 334 and the inner plate 358 toward the inlet 330a of the blower fan 330. That is, the air flowing between the shroud 334 and the inner plate 358 toward the inlet 330a of the blower fan 330 may be primarily blocked by the first rib 368a and the second rib 368b, and may be secondarily blocked by the structure of the bell mouth 360 and the suction guider 336.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. An air cleaner comprising:
a blower having an outlet formed on an upper side thereof;

a circulator disposed on the blower; and
a mover coupled to the circulator and configured to change an arrangement of the circulator,
wherein the circulator comprises:
a lower cover having a lower plate coupled to the mover, and having an inlet formed around the lower plate;
an upper cover disposed above the lower cover and having an outlet;
a blower fan rotatably disposed between the lower cover and the upper cover, having a circular inlet formed on a lower side and an annular outlet formed on an upper side, and including a suction guider having a cylindrical shape and extending downwardly from a circumference of the circular inlet;
a motor disposed on an upper side of the lower plate and rotating the blower fan;
an inner cover disposed over the lower cover and receiving a lower portion of the blower fan,
wherein the inner cover comprises:
an inner plate having an inlet formed therein; and
a bell mouth protruding upwardly from an inner circumferential end of the inner plate and spaced apart outwardly from a circumferential surface of the suction guider.

2. The air cleaner of claim 1, wherein the bell mouth configured to guide air, drawn in through the inlet of the lower cover, toward the inlet of the blower fan.

3. The air cleaner of claim 1, wherein the blower fan comprises a hub coupled to the motor, a shroud having an inlet which is formed at a center portion and through which air is drawn in, and a plurality of blades disposed between the hub and the shroud,
wherein the suction guider protrudes downwardly from an inner circumferential end of the shroud.

4. The air cleaner of claim 3, wherein:
the inner plate is disposed under the shroud; and
the bell mouth protrudes from an inner circumferential end of the inner plate in a direction in which the shroud is disposed.

5. The air cleaner of claim 4, wherein the bell mouth comprises:
an upper bell mouth protruding upwardly from the inner circumferential end of the inner plate; and
a lower bell mouth protruding downwardly from the inner circumferential end of the inner plate.

6. The air cleaner of claim 1, wherein an upper end of the bell mouth is disposed above a lower end of the suction guider.

7. The air cleaner of claim 1, wherein an upwardly extending length of the bell mouth is greater than a spaced-apart distance between the bell mouth and the suction guider.

8. The air cleaner of claim 1, wherein the inner cover further comprises a housing forming a space in which the motor is disposed,
wherein the inner cover has an annular inlet formed between the housing and the inner plate.

9. The air cleaner of claim 8, wherein the inner cover comprises a plurality of grills which are arranged alternately in a vertical direction at the annular inlet formed between the housing and the inner plate, and which connect the housing and the inner plate.

10. The air cleaner of claim 8, wherein the blower fan comprises:
an inner hub coupled to the motor;
an outer hub that extends from a periphery of the inner hub and that is inclined upward from the inner hub;
a shroud that is spaced apart from the outer hub, the shroud having (i) the circular inlet defined at a center portion of the shroud and configured to receive air and (ii) the annular outlet defined between the outer hub and the shroud; and
a plurality of blades that extend downward from the outer hub and that are disposed between the outer hub and the shroud, and
wherein a distance between the housing and the bell mouth is greater than a distance between an inner circumferential end of the shroud and an inner circumferential end of the outer hub.

11. The air cleaner of claim 8, wherein the housing extends upwardly parallel to the bell mouth.

12. The air cleaner of claim 1, further comprising a protrusion protruding radially inwardly from a lower end of the bell mouth.

13. The air cleaner of claim 12, wherein a length of the protrusion, which protrudes radially inwardly, increases from a lower end to an upper end.

14. The air cleaner of claim 12, wherein a diameter of an inner circumferential end of the protrusion is greater than or equal to a diameter of the suction guider.

15. The air cleaner of claim 4, wherein a rib protrudes from one of the inner plate or the shroud.

16. The air cleaner of claim 4, wherein:
the shroud comprises a first rib formed at a position spaced apart radially outwardly from the suction guider, and protruding toward the inner plate; and
the inner plate comprises a second rib formed at a position spaced apart radially outwardly from the bell mouth and protruding toward the shroud.

17. The air cleaner of claim 16, wherein a lower end of the first rib is disposed below an upper end of the second rib.

18. An air cleaner comprising:
a blower having an outlet formed on an upper side thereof; and
a circulator disposed over the blower and configured to control a wind direction of air flowing upwardly through the outlet,
wherein the circulator comprises:
a blower fan having a circular inlet formed on a lower side and an annular outlet formed on an upper side;
an upper cover disposed over the blower fan, and guiding air, blown by the blower fan, in a direction in which a rotation axis of the blower fan is directed;
a motor disposed at the outlet of the blower fan and rotating the blower fan; and
an inner cover disposed around the motor, and guiding the air, drawn in through the circular inlet formed in the lower side, toward the blower fan,
wherein the inner cover comprises a housing forming a space in which the motor is disposed, an inner plate spaced apart radially outwardly from the housing and forming an inlet with the housing, and a bell mouth protruding upwardly from an inner circumferential end of the inner plate, and
wherein the bell mouth has a diameter greater than the inlet formed in the blower fan.

* * * * *